United States Patent [19]

Matsumoto et al.

[11] Patent Number: 5,162,996

[45] Date of Patent: Nov. 10, 1992

[54] SHOCK ABSORBER CONTROLLER

[75] Inventors: Tadaichi Matsumoto, Toyota; Nobuaki Kanamori, Susono, both of Japan

[73] Assignee: Toyota Jidosha Kabushiki Kaisha, Toyota, Japan

[21] Appl. No.: 516,712

[22] Filed: Apr. 30, 1990

[30] Foreign Application Priority Data

May 12, 1989 [JP] Japan .................................. 1-119597

[51] Int. Cl.$^5$ .............................................. B60G 17/06
[52] U.S. Cl. ............................... 364/424.05; 280/707; 280/840
[58] Field of Search .................... 364/424.05; 280/707, 280/840, DIG. 1

[56] References Cited

U.S. PATENT DOCUMENTS

| | | | |
|---|---|---|---|
| 4,714,272 | 12/1987 | Buma et al. | 280/707 |
| 4,728,120 | 3/1988 | Buma et al. | 280/707 |
| 4,729,580 | 3/1988 | Buma et al. | 280/707 |
| 4,744,589 | 5/1988 | Buma et al. | 280/707 |
| 4,756,549 | 7/1988 | Kurosawa et al. | 280/707 |
| 5,015,007 | 5/1991 | Uchiyama et al. | 280/707 |
| 5,044,661 | 9/1991 | Kawabata | 280/707 |

*Primary Examiner*—Gary Chin
*Attorney, Agent, or Firm*—Oblon, Spivak, McClelland, Maier & Neustadt

[57] ABSTRACT

A shock absorber controller controls a shock absorber so that a damping force thereof is altered to an increased magnitude after the elapse of a predetermined delay time when it is determined that a vertical movement of a vehicle body exceeds a first threshold value, and the damping force is maintained at the increased magnitude for a predetermined hold time. After a determination inhibiting time elapses, it is determined whether or not the vertical movement of the vehicle body exceeds a second threshold value. When it is determined that the vertical movement has become greater than the second threshold value, the damping force of the shock absorber is maintained at the increased magnitude for a predetermined time even after the predetermined hold time elapses.

21 Claims, 7 Drawing Sheets

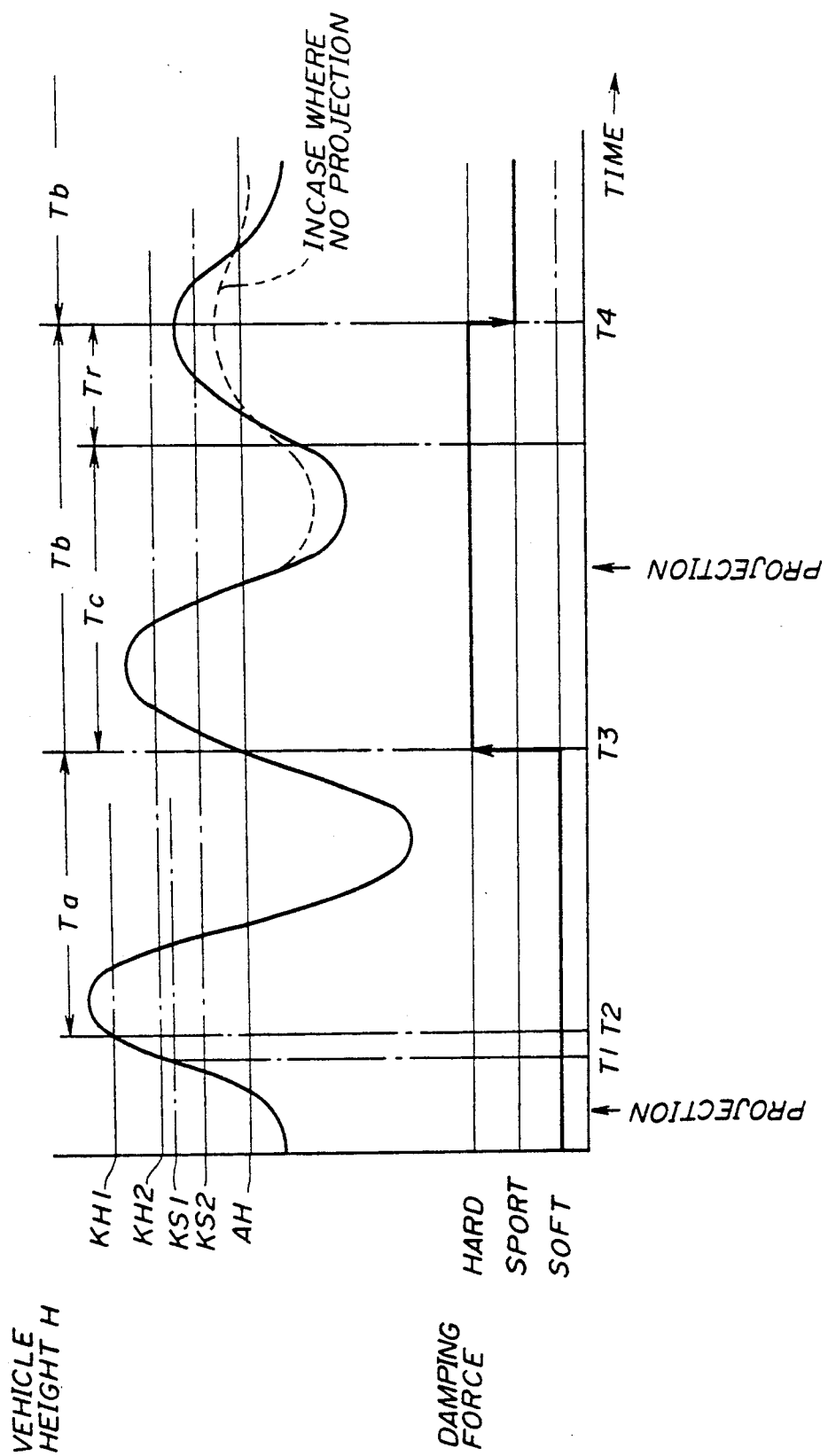

SHOCK ABSORBER CONTROLLER

BACKGROUND OF THE INVENTION (1) Field of the Invention

The present invention relates to a shock absorber controller for altering a damping force of a shock absorber in a vehicle suspension in response to a vertical movement of a vehicle body due to a rough road surface.

(2) Description of the Prior Art

Conventionally, there is known an apparatus for controlling a damping force of a shock absorber provided between a vehicle body and each wheel so that a vertical movement of a vehicle body due to a rough road surface is suppressed in an early stage of the vertical movement. Japanese Laid-Open Patent Application No. 62-166104, entitled "SHOCK ABSORBER CONTROLLER", discloses an apparatus in which the shock absorber is controlled so that the damping force thereof is altered from a weak state to a strong state when a predetermined delay time has elapsed after the vehicle height exceeds to a definite value. The predetermined delay time is determined, taking into consideration the vertical movement cycle of the vehicle body so that the magnitude of the damping force is changed within half of the first one-cycle of the vertical movement. With this arrangement, it is possible to suppress a large vertical vehicle movement within half of the first one-cycle so that the vehicle height can return to a mean vehicle height or position.

The increased damping force of the shock absorber must be decreased to the weak state when the vertical movement of the vehicle body is considerably suppressed. For example, the damping force is maintained in the strong state for a predetermined hold time and is then returned to the weak state.

However, the above-mentioned prior shock absorber controller has the following disadvantages. In actuality, it is very difficult to suppress a vertical movement of the vehicle body by means of an increased damping force. For example, there is a possibility that the vehicle height may exceed the aforementioned definite value again even during the predetermined hold time. In this case, an instruction is generated again which causes the damping force of the shock absorber to be increased to the strong state after the predetermined delay time from the time when the vehicle height exceeds the definite value again. In this case, the hold time is renewed so that the damping force of the shock absorber may be maintained in the strong state for a longer time than necessary. That is, it is determined that the vehicle is running on a continuous rough road even when the road surface is smooth, and thus the damping force is maintained in the strong state. This deteriorates ride comfort.

SUMMARY OF THE INVENTION

It is a general object of the present invention to provide an improved shock absorber controller in which the aforementioned disadvantages are eliminated.

A more specific object of the present invention is to provide a shock absorber controller capable of preventing a determination from being made that the vehicle is running on a continuous rough road irrespective of the fact that the vehicle is not actually running on such a continuous rough road, so that ride comfort is drastically improved.

The above-mentioned objects of the present invention are achieved by a shock absorber controller for controlling a damping force of a shock absorber provided between a vehicle body and a wheel, comprising vertical movement detection means for detecting a vertical movement of the vehicle body relative to the wheel; first excess determination means, coupled to said vertical movement detection means, for determining whether or not the vertical movement of the vehicle body exceeds a first threshold value; and damping force increase/hold means, coupled to said shock absorber and said first excess determination means, for altering the damping force of the shock absorber to an increased magnitude when a predetermined delay time elapses from a time at which said first excess determination means determines that the vertical movement of the vehicle body exceeds said first threshold value and for holding the damping force of the shock absorber at said increased damping magnitude for a predetermined hold time. The controller also comprises timer means, coupled to said damping force increase/hold means, for providing a passage time from said predetermined delay time; passage time determination means, coupled to said timer means, for determining whether the passage time provided by said timer means represents a time before a determination executing period or within the same, said determination executing period being a period of time before an end of said predetermined hold time; and inhibiting means, coupled to said first excess determination means and said passage time determination means, for inhibiting said first excess determination means from determining whether or not the vertical movement of the vehicle body exceeds said first threshold value when said passage time determination means determines that the passage time represents a time before said determination executing period. The controller further comprises second excess determination means, coupled to said vertical movement detection means and said passage time determination means, for determining, when said passage time determination means determines that the passage time represents a time within said predetermined executing period, whether or not the vertical movement of the vehicle body detected by said vertical movement detection means exceeds a second threshold value; and hold time elongating means, coupled to said damping force increase/hold means and said second excess determination means, for elongating said hold time by a predetermined time when said second excess determination means determines that the vertical movement of the vehicle body exceeds said second threshold value.

The aforementioned objects of the present invention are also achieved by a shock absorber controller for controlling a damping force of a shock absorber provided between a vehicle body and a wheel, comprising vertical movement detection means for detecting a vertical movement of the vehicle body relative to the wheel; first excess determination means, coupled to said vertical movement detection means, for determining whether or not the vertical movement of the vehicle body exceeds a first threshold value; and damping force increase/hold means, coupled to said shock absorber and said first excess determination means, for altering the damping force of the shock absorber to an increased magnitude when a predetermined delay time elapses from a time at which said first excess determination means determines that the vertical movement of the vehicle body exceeds said first threshold value and for holding the damping force of the shock absorber at said increased damping magnitude for a predetermined hold time. The controller also comprises second excess determination means, coupled to said vertical movement detecting means, for determining, during a determination executing period after a predetermined inhibiting time elapses, whether or not the vertical movement of the vehicle body exceeds a second threshold value which indicates a position of the vehicle body closer to a mean position of the vehicle body than a position corresponding to said first threshold value; and hold time elongating means, coupled to said damping force increase/hold means and said second excess determination means, for elongating said hold time by a predetermined time from an end point of said determination executing period when said second excess determination means determines that the vertical movement of the vehicle body exceeds said second threshold value.

BRIEF DESCRIPTION OF THE DRAWINGS

Further objects, features and advantages of the present invention will become apparent from the following detailed description when read in conjunction with the accompanying drawings, in which:

FIG. 4 is a diagram illustrating how to combine FIGS. 4A and 4B;

FIGS. 5A and 5B are timing charts illustrating how the shock absorber is controlled according to the control process shown in FIGS. 4A and 4B.

DESCRIPTION OF THE PREFERRED EMBODIMENT

Figure 1:
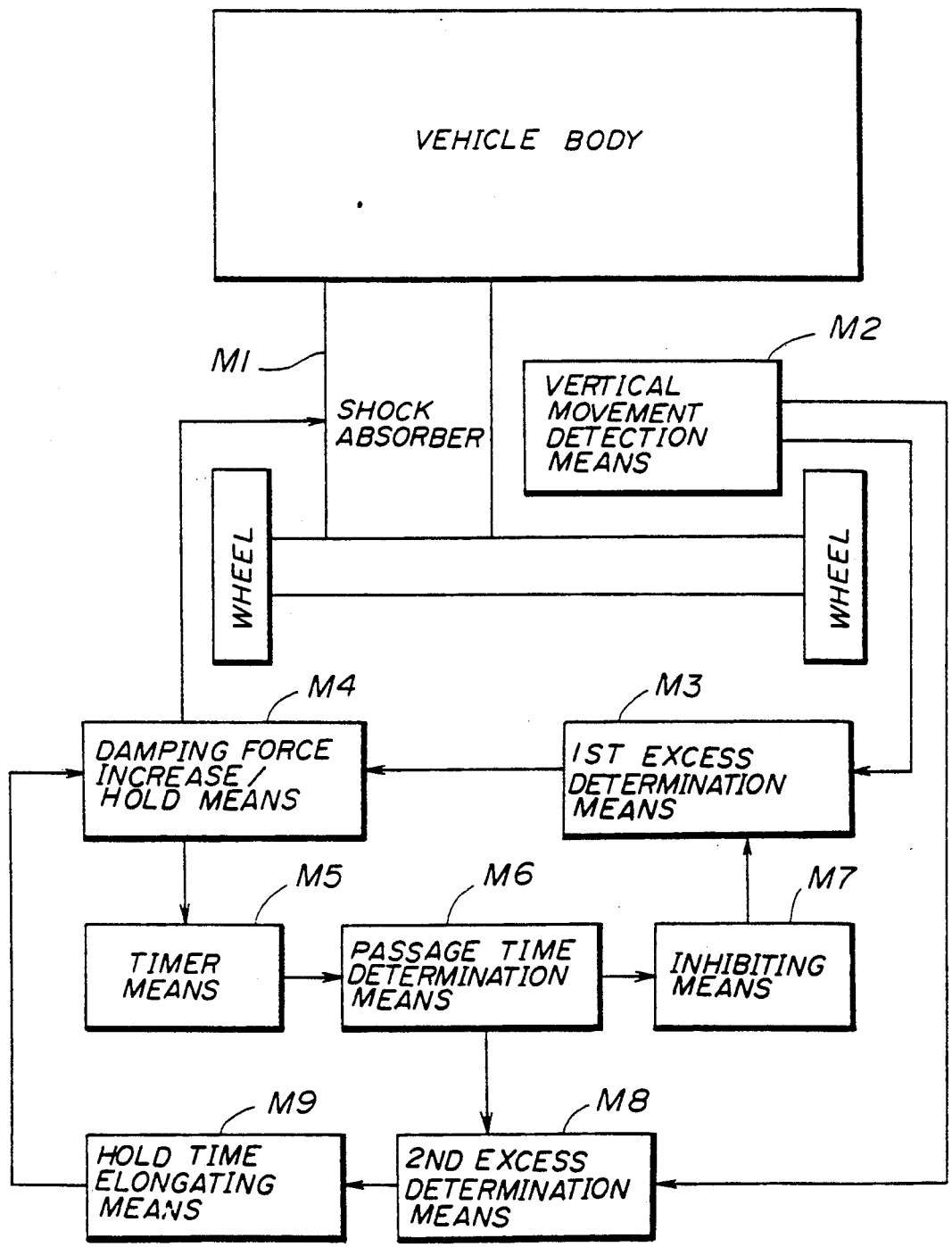
FIG. 1 is a block diagram illustrating the principle of a shock absorber controller according to the present invention.

A description will now be given of the principle of a shock absorber controller according to the present invention with reference to FIG. 1. The shock absorber controller shown in FIG. 1 controls a shock absorber M1, and comprises a vertical movement detection means M2, a first excess determination means M3, a damping force increase/hold means M4, a timer means M5, a passage time determination means M6, an inhibiting means M7, a second excess determination means M8 and a hold time elongating means M9.

The shock absorber M1 is of a variable damping force type and provided between a vehicle body and a wheel. The vertical movement detection means M2 detects a vertical movement of the vehicle body relative to the wheel. The first excess determination means M3 determines whether or not the vertical movement of the vehicle body detected by the vertical movement detection means M2 exceeds a first threshold value. The damping force increase/hold means M4 increases the damping force of the shock absorber M1 after a predetermined delay time from the time when it is determined that the vertical movement of the vehicle body exceeds the first threshold value, and holds an increased damping force for a predetermined hold time. The timer means M5 measures the passage of time from the end of the predetermined delay time. The passage time determination means M6 determines whether the passage time indicated by the timer means M5 represents a time before a determination executing period or within the determination executing period. The determination executing period is a predetermined period of time before the end of the aforementioned predetermined hold time. The inhibiting means M7 inhibits the first excess determination means M3 from executing the determination procedure when the passage time determination means M6 determines that the passage time from the predetermined delay time has not yet reached the determination executing period. The second excess determination means M8 determines whether or not the vertical movement of the vehicle body exceeds a second threshold value when the passage time determination means M6 determines that the passage time from the predetermined delay time represents a time within the determination executing period. The second threshold value corresponds to a vehicle height which is equal to a vehicle height corresponding to the first threshold value or closer to a mean vehicle position than the vehicle height corresponding to the first threshold value. The hold time elongating means M9 elongates the hold time used in the damping force increase/hold means M4 by a predetermined time when the second excess determination means M8 determines that the vertical movement of the vehicle body exceeds the second threshold value.

The shock absorber controller in FIG. 1 operates as follows. When the first excess determination means M3 determines that the vertical movement of the vehicle body relative to the wheel detected by the vertical movement detection means M2 exceeds the first threshold value, the damping force increase/hold means M4 causes the shock absorber M1 to provide an increased damping force when the predetermined delay time elapses from the time when the above decision was made. The timer means M5 provides a passage time after the elapse of the predetermined delay time. The passage time determination means M6 determines whether the passage time from the timer means M5 indicates a time prior to the determination executing period or within the same. When it is determined that the passage time represents a time before the determination executing period, the inhibiting means M7 prevents the first excess determination means M3 from executing the determination procedure. On the other hand, when it is determined that the passage time represents a time within the determination executing period, the passage time determination means M6 activates the second excess determination means M8. Then it is determined whether the vertical movement of the vehicle body exceeds the second threshold value. When it is determined that the vertical movement exceeds the second threshold value, the hold time elongating means M9 instructs the damping force increase/hold means M4 to elongate the hold time during which the damping force is maintained at an increased magnitude.

It will now be assumed that the wheel runs over an obstacle or a projection on a road surface and thereby the vertical movement relative to the wheel exceeds the first threshold value so that the damping force is increased after the predetermined delay time from the time at which the above decision was made. If there is no obstacle or projection other than the above-mentioned obstacle or no objection on the road surface, the vertical movement of the vehicle body has been suppressed so that it does not exceed the second threshold value, when the passage time reaches the beginning of the determination executing period. When the hold time elapses, the damping force is decreased to a small value. It will be noted that the hold time and the determination executing period can be selected beforehand so that the vertical movement does not exceed the second threshold value during the determination executing period. On the other hand, if there is another obstacle or projection on the road surface, there is a possibility that the vertical movement of the vehicle body will not be suppressed within the determination executing period so that the vertical movement will exceed the second threshold value. In such a case, it will be judged that there is another obstacle or projection and thus the hold time will be elongated by the predetermined time. Thus, the problems of the aforementioned conventional shock absorber controller will be eliminated.

Figure 2:
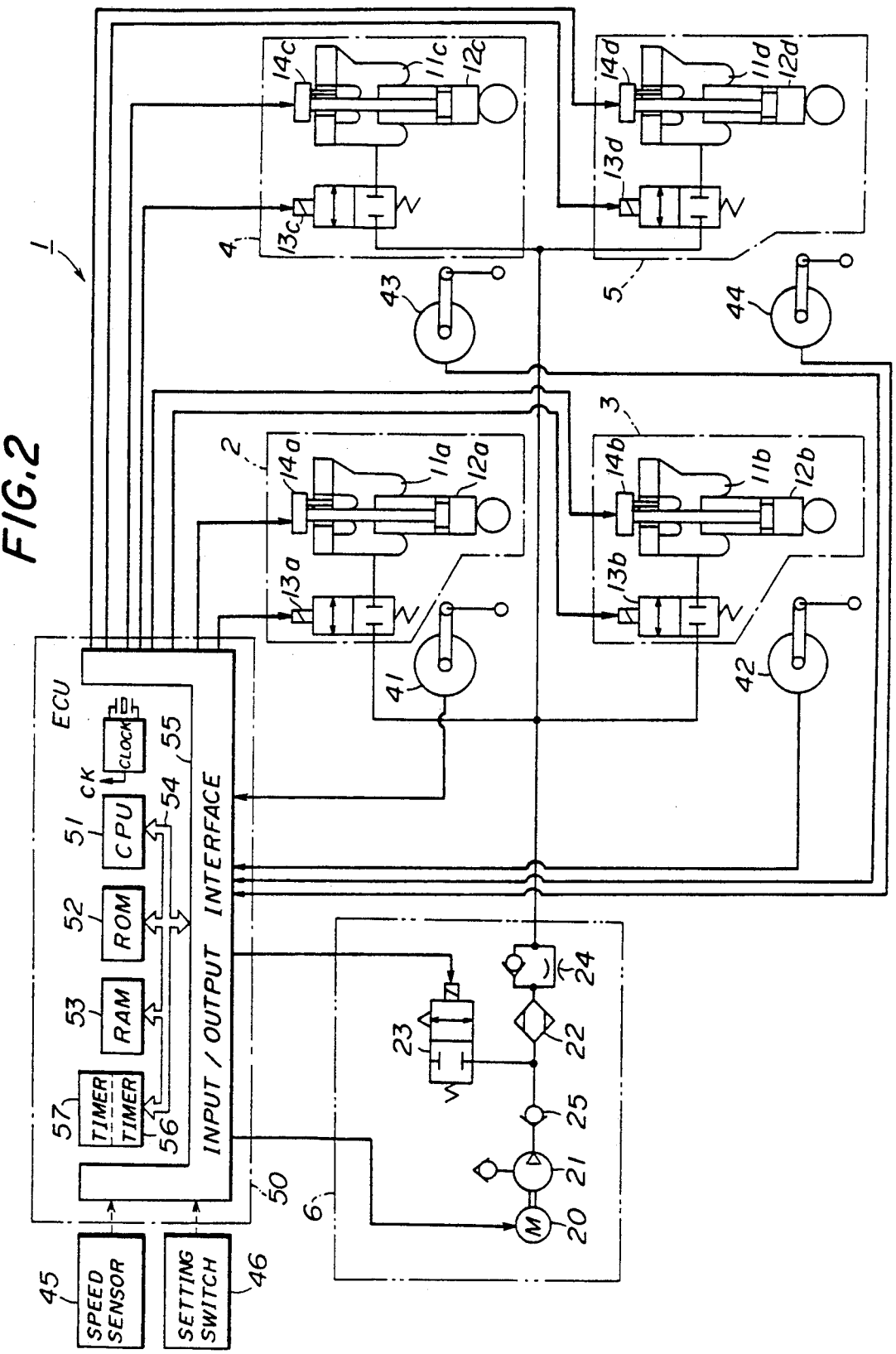
FIG. 2 is a diagram illustrating the shock absorber controller based on the principle shown in FIG. 1 and air suspensions including shock absorbers controlled thereby according to a preferred embodiment of the present invention.

A description will now be given of a preferred embodiment of the present invention. FIG. 2 illustrates a system having air suspensions and a shock absorber controller for controlling the air suspensions according to the preferred embodiment of the present invention. Air suspensions 2, 3, 4 and 5 are respectively provided between a vehicle body and left and right front wheels and left and right rear wheels. Since each of the air suspensions 2, 3, 4 and 5 has the same structure, only the air suspension 2 provided between the vehicle body and the right front wheel will be described in detail for the sake of convenience.

The air suspension 2 includes a variable volume type air chamber 11a and a variable damping force type shock absorber 12a. The air chamber 11a functions to change the vehicle height. Further, the air suspension 2 includes a vehicle height control valve 13a and an air suspension actuator 14a. The vehicle height control valve 13a, which is a 2-port and 2-position electromagnetic valve of a spring off-set type, normally interrupts the passage of compressed air from a compressed air feed and discharge system 6, and connects the air passage when adjusting the vehicle height. The air suspension actuator 14a functions to alter the magnitude of the damping force of the shock absorber 12a. The air suspensions 2, 3, 4 and 5 are further described in U.S. Pat. No. 4,744,589, the disclosure of which is hereby incorporated by reference.

The compressed air feed and discharge system 6 includes a motor 20, a compressor 21, an air drier 22, an air solenoid valve 23 and check valves 24 and 25. The motor 20 drives the compressor 21 to generate compressed air necessary to increase the vehicle height. The air drier 22 functions to dry the compressed air from the compressor 21 via the check valve 25. The air solenoid valve 23 discharges air from the air chambers 11a, 11b, 11c and 11d when decreasing the vehicle height. During adjustment of the vehicle height, the air solenoid valve 23 is controlled so that it is maintained in a closed state or an open state. When the air solenoid value 23 is closed and the vehicle height control valves 13a, 13b, 13c and 13d are opened, the compressed air from the compressor 21 is fed to the vehicle height control valves 13a, 13b, 13c and 13d so that the vehicle height is increased. On the other hand, when the air solenoid value 23 is opened and the vehicle height control valves 13a, 13b, 13c and 13d are opened, the compressed air in the air chambers 11a, 11b, 11c and 11d is discharged therefrom so that the vehicle height is decreased.

Figure 3A:
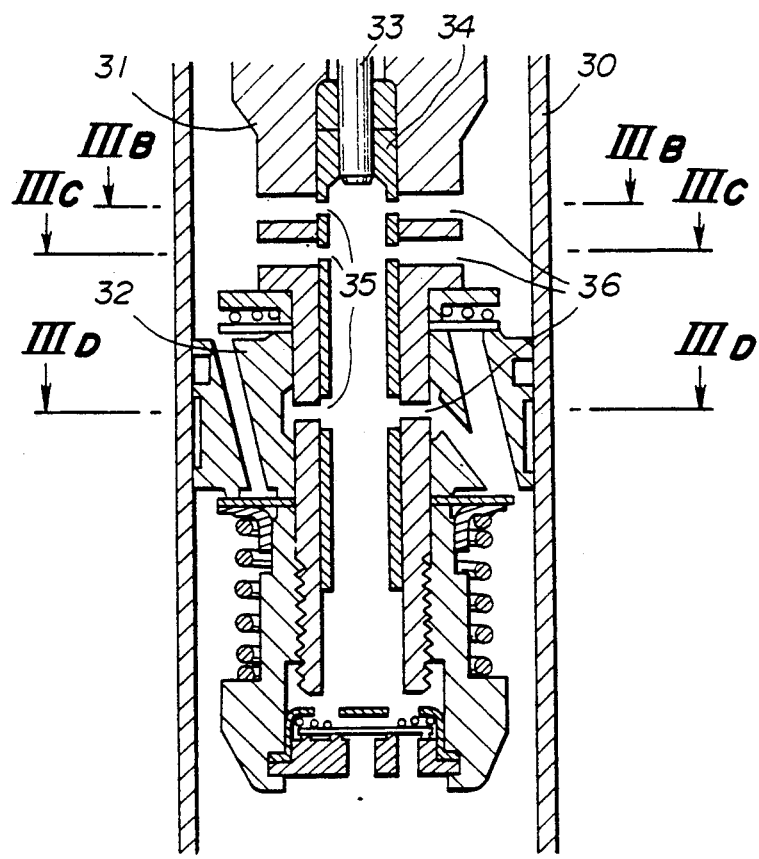
FIG. 3A is a vertical sectional view of a shock absorber used in the embodiment shown in FIG. 2.
Figures 3B, 3C, 3D:
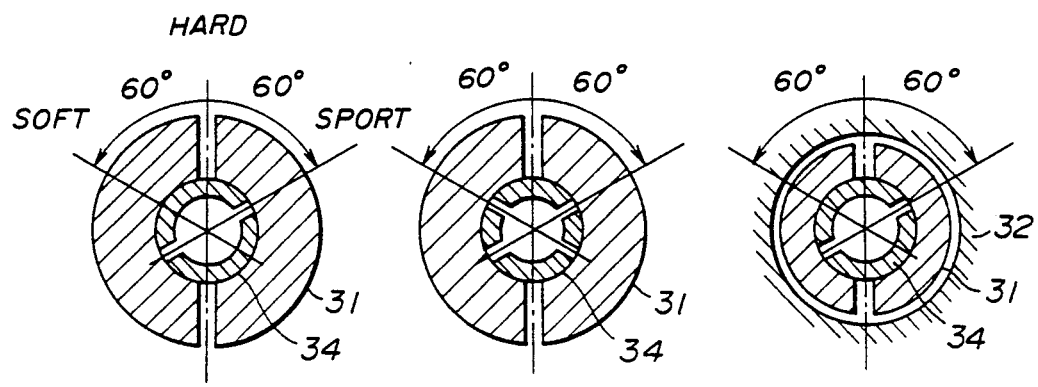
FIG. 3B is a view taken along line $III_B$—$III_B$ shown in FIG. 3A.
FIG. 3C is a view taken along line $III_C$—$III_C$ shown in FIG. 3A.
FIG. 3D is a view taken along line $III_D$—$III_D$ shown in FIG. 3A.

The shock absorber 12a will be described below with reference to FIGS. 3A through 3D. FIGS. 3B, 3C and 3D are diagrams respectively taken along lines III$_B$—III$_B$, III$_C$—III$_C$ and III$_D$—III$_D$ shown in FIG. 3A. Each of the shock absorbers 12b, 12c and 12d has the same structure as the shock absorber 12a. Referring to FIG. 3A, the shock absorber 12a includes a piston rod 31 provided inside an outer cylinder 30 and a piston 32 which is slidably fitted in an inner wall of the outer cylinder 30. Inside the piston rod 31 is movably provided a control rod 33, which is driven by the air suspension actuator 14a (FIG. 4). A rotary valve 34 integrated with the control rod 33 is provided inside the piston rod 31. The rotary valve 34 is provided with three orifices 35, and the piston rod 31 is provided with three orifices 36. The air suspension actuator 14a rotates the control rod 33 so that the orifices 35 and 36 are opened or closed and the amount of oil passing therethrough is adjusted. By means of the adjustment of the damping force of the shock absorber 12a, it is possible to set the suspension characteristic to either SOFT state, SPORT state or HARD state. When the damping force is adjusted so as to be small, the suspension characteristic is set to SOFT state. When the damping force is adjusted so as to be large, the suspension characteristic is set to HARD state. The SPORT state is an intermediate state between SOFT state and HARD state.

The air suspension actuator 14a includes a direct current motor (not shown), the rotation force of which is transferred to the control rod 33 of the shock absorber 12a via a gear engaging with a shaft of the direct current motor. This arrangement is disclosed in U.S. Pat. No. 4,756,549, the disclosure of which is hereby incorporated by reference. When the direct current motor is rotated in a normal or reverse direction under the control of an electronic control unit 50 (which will be described in detail later), the control rod 33 rotates in the normal or reverse direction so that the aforementioned orifices 35 and 36 are opened or closed. Thus, the damping forces of the shock absorbers 12a, 12b, 12c and 12d are altered.

The vehicle shown in FIG. 2 includes conventional vehicle height sensors 41, 42, 43 and 44, a vehicle speed sensor 45 and a vehicle height setting switch 46. Each of the vehicle height sensors 41, 42, 43 and 44 is provided between the vehicle body and a corresponding one of the four wheels, and outputs a detection signal representative of a vehicle height H corresponding to a gap between the vehicle body and a corresponding suspension arm which moves in response to a vertical movement of the wheel. The vehicle speed sensor 45 detects the speed of the vehicle. The vehicle height setting switch 46 is used for inputting a target vehicle height data such as a threshold value.

The output signals from the sensors 41-45 and the vehicle height setting switch 46 are input to the electronic control unit (hereafter simply referred to as an ECU) 50. On the other hand, the ECU 50 drives the motor 20, and the air solenoid valves 13a, 13b, 13c and 13d to control the vehicle height. Further, the ECU 50 drives the air suspension actuators 14a, 14b, 14c and 14d so that the damping force of each shock absorber (corresponding to suspension characteristic) is selectively reset to either one of SOFT state, SPORT state or HARD state.

The ECU 50 includes a central processing unit (hereafter simply referred to as a CPU) 51, a read only memory (hereafter simply referred to as a ROM) 52 and a random access memory (hereafter simply referred to as a RAM) 53, all of which are connected to each other through a common bus 54 connected to an input/output interface circuit 55. The ROM 52 stores a program of the control procedure shown in FIGS. 6A and 6B. The RAM 53 temporarily stores various data. The signals from the aforementioned sensors 41 through 45 and the switch 46 are input to the CPU 51 through the input/output interface circuit 55. On the other hand, the CPU 51 outputs control signals to the aforementioned actuators and valves through the input/output interface circuit 55. The ECU 50 includes first and second timers 56 and 57 of a self-running type, each of which generates an interrupt to the operation of the CPU 51. Each of the first and second times 56 and 57 counts a clock signal CK generated by a clock generator provided in the ECU 50.

Figure 4A:
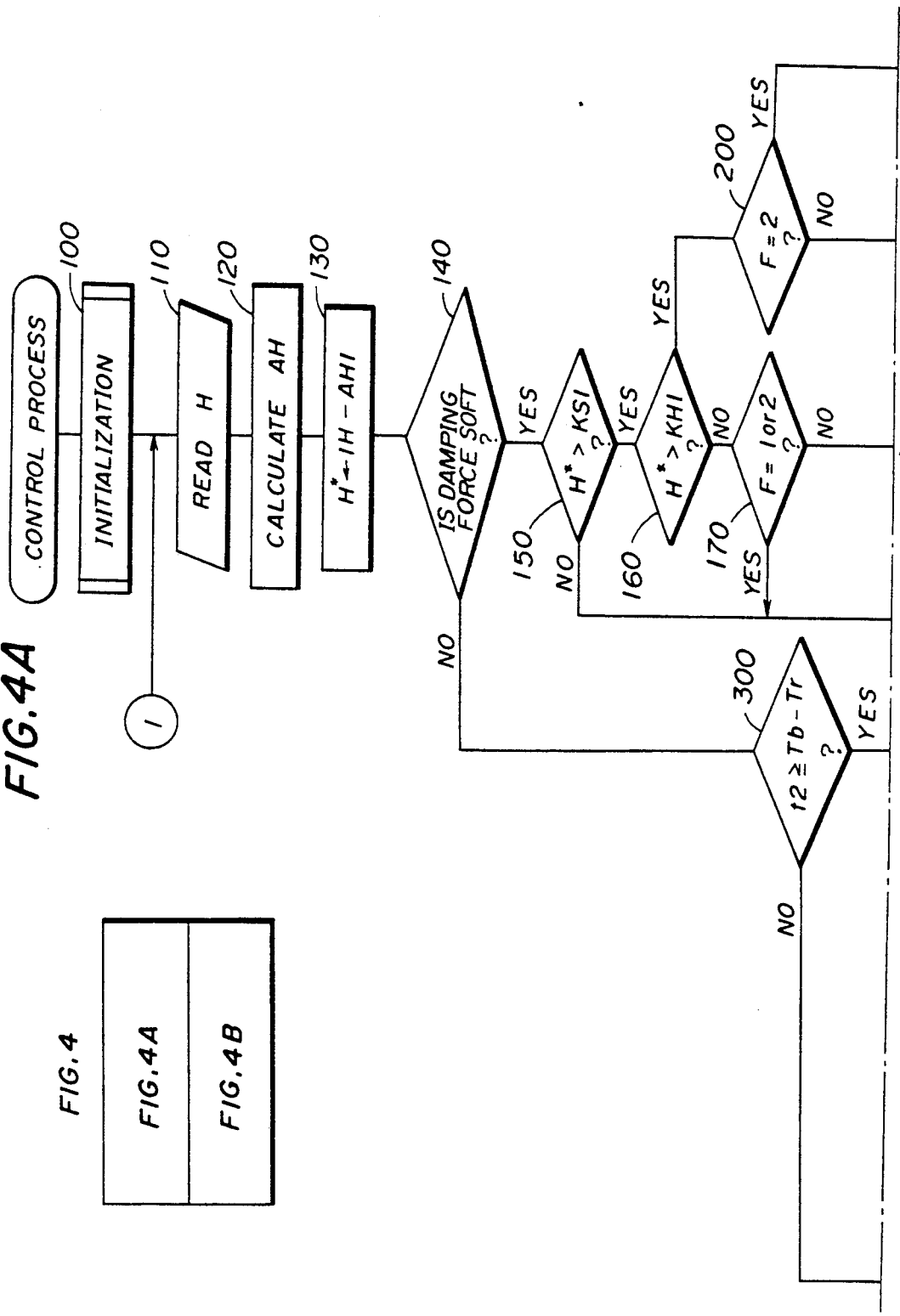
FIGS. 4A and 4B are flowcharts showing a shock absorber control process according to the embodiment of the present invention shown in FIG. 2.
Figure 4B:
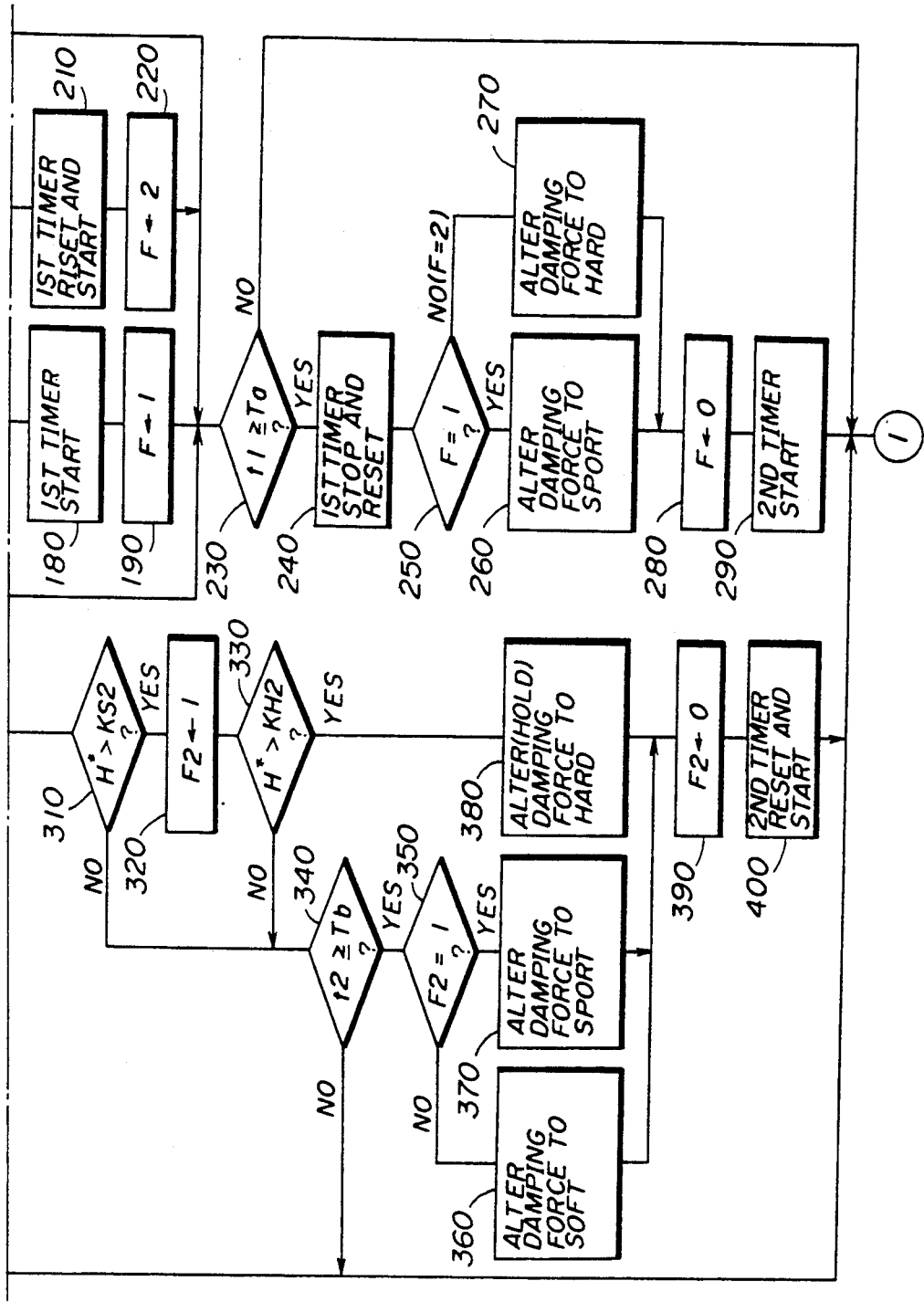

A description will now be given of a process of controlling the aforementioned shock absorbers 12a, 12b, 12c and 12d with reference to FIGS. 4A and 4B. The control process shown in FIGS. 4A and 4B is independently carried out for each of the shock absorbers 12a, 12b, 12c and 12d, and thus the control process for the shock absorber 12a provided for the right front wheel will be described in detail below for the sake of convenience.

The ECU 50 is activated and the control process is started. At step 100, an initialization is executed, i.e., the RAM 53 is cleared, and the first and second timers 56 and 57 and registers for storing various data are reset to zero. At step 110, a process is executed in which data representative of the vehicle height H is derived from the sensor signal from the vehicle height sensor 41 provided for the right front wheel. At step 120, a process is executed which calculates an averaged vehicle height AH representative of a mean position of the vehicle body with respect to vertical movement thereof. For example, step 120 refers to previously obtained eight averaged vehicle heights, AH1 (the latest data), AH2, ..., AH8 and uses the following equation:

$$AH = \left[ \left( \sum_{n=1}^{8} AHn + 4 \right) \cdot 1 + 3 \cdot AH1 + 4) \right] / 8.$$

At step 130, the CPU 51 calculates an absolute value of the difference between the vehicle height H obtained at step 110 and the averaged vehicle height AH obtained at step 120, and determines the absolute value to be a vehicle height displacement H*. At step 140, the CPU 51 determines whether or not the current damping force of the shock absorber 12a is controlled so as to be SOFT. The damping force of the shock absorber 12a is controlled so that it is maintained in SOFT state for a while after the ECU 50 is activated. When it is determined, at step 130, that the damping force of the shock absorber 12a is in SOFT state, the control process proceeds to step 150.

At step 150, the CPU 51 determines whether or not the vehicle height displacement H* is greater than a a first threshold value KS1 for SPORT (hereafter referred to as a first sport threshold value). When the result obtained at step 150 is YES, the control process proceeds to step 160, at which step it is further determined whether or not the vehicle height displacement H* is greater than a first threshold value KH1 for HARD (hereafter referred to as a first hard threshold value). When it is determined, at step 160, that the vehicle height displacement H* is equal to or less than the first hard threshold value KH1, the control process proceeds to step 170. At this step, the CPU 51 determines whether a flag F (which will be described later) is 1 or 2. When it is determined that the flag F is set to neither 1 nor 2, the CPU 51 instructs the first timer 56 to start to operate at step 180 (FIG. 4B). At step 190, the CPU 51 sets the flag F to 1. On the other hand, when it is determined, at step 160 (FIG. 4A), that the vehicle height displacement H* is greater than the first hard threshold value KH1 for HARD, the control process proceeds to step 200, at which step it is determined whether or not the flag F has a value of 2. When the result obtained at step 200 is NO, at step 210, the CPU 51 resets the first timer 56 to zero and starts to operate the same. At step 220, the CPU 51 sets the flag F to 2.

Step 190 or step 220 is executed and then the control process proceeds to step 230, at which step the CPU 51 determines whether or not time $t_1$ indicated by the first timer 56 is equal to or greater than a predetermined delay time Ta. When step 150 determines that the vehicle height displacement H* is equal to less than the first sport threshold value KS1, when step 170 determines that the flag F is neither 1 nor 2, or when it is determined at step 200 that the flag F is 2, the control process proceeds to step 230. When it is determined, at step 230, that $t_1 \geq Ta$, the control process proceeds to step 240, at which step the CPU 51 stops the first timer 56 and resets the same to zero. At step 250, it is determined whether or not the flag F is 1. When it is determined, at step 250, that the flag F has a value of 1, the control process proceeds to step 260. At this step, the CPU 51 activates the air suspension actuator 14a provided for the right front wheel so that the damping force of the shock absorber 12a is altered to SPORT. When it is determined, at step 250, that the flag F is not 1, that is, F=2, the CPU 51 activates the air suspension actuator 14a at step 270 so that the damping force of the shock absorber 12a is altered to HARD. After executing step 260 or step 270, the CPU 51 resets the flag F to zero at step 280, and has the second timer 57 start to operate, at step 290. Then the control process returns to step 110, and the aforementioned procedure starting from step 110 is repeatedly executed.

When it is determined, at step 140, that the damping force of the shock absorber 12a is not SOFT, that is, either SPORT or HARD, the control process proceeds to step 300. At this step, the CPU 51 determines whether or not time $t_2$ indicated by the second timer 57 is greater than a value obtained by subtracting a predetermined determination executing period Tr from the predetermined hold time Tb ($t_2 \geq Tb - Tr$). When it is determined that $t_2 < Tb - Tr$, the control process returns to step 110, and the procedure starting from step 110 is repeatedly carried out. That is, when time $t_2$ indicated by the second timer 57 is less than a value obtained by subtracting the predetermined determination executing period Tr from the predetermined hold time Tb, the procedure following step 310 is inhibited from being executed. Of course, the determination process from step 150 is inhibited from being executed because the damping force of the shock absorber 12a is set to HARD and thus the result obtained at step 14 is negative.

On the other hand, it is determined, at step 300, that $t_2 \geq Tb - Tr$, and then the control process proceeds to step 310. At this step, the CPU 51 determines whether or not the vehicle height displacement H* is greater than a second threshold value KS2 for SPORT (hereafter referred to as a second sport threshold value). When it is determined that H*>KS2, the control process proceeds to step 320, at which step a value of 1 is written into a flag F2. At step 330, the CPU 51 determines whether or not the vehicle height displacement H* is greater than a second threshold value KH2 for HARD (hereafter referred to as a second hard threshold value). The second sport threshold value KS2 is selected so that it is closer to the averaged vehicle height AH than the first sport threshold value KS1, and the second hard threshold value KH2 is selected so that it is equal to the first hard threshold value KH1 or closer to the averaged vehicle height AH than the first hard threshold value KH1. When it is determined, at step 330, that the the vehicle height displacement H* is not greater than the second hard threshold value KS2, or when it is determined, at step 310, that the vehicle height displacement H* is not greater than the second sport threshold value KS2, the control process proceeds to step 340. At this step, the CPU 51 determines whether or not time $t_2$ indicated by the hold second timer 57 is greater than the hold time Tb ($T_2 \geq Tb$). When it is determined that $T_2 \geq Tb$, the control process proceeds to step 350. At this step, the CPU 51 determines whether or not the flag F is equal to 1. When it is determined that F2 is not equal to 1, the control process proceeds to step 360, at which step the CPU 51 drives the air suspension actuator 14a so that the damping force of the shock absorber 12a is altered to SOFT. On the other hand, when it is determined, at step 350, that the flag F2 is equal to 1, the control process proceeds to step 370. At this step, the CPU 51 drives the air suspension actuator 14a so that the damping force of the shock absorber 12a is altered to SPORT. When it is determined, at step 340, that $t_2 < Tb$, the control process returns to step 110, and the procedure starting from step 110 is repeatedly carried out.

On the other hand, when it is determined, at step 330, that the vehicle height displacement H* is greater than the second hard threshold value KH2, the control process proceeds to step 380. At this step, the CPU 51 drives the air suspension actuator 14a immediately so that the damping force of the shock absorber 12a is altered to HARD (or maintained).

After executing steps 360, 370 or 380, the CPU 51 clears the flag F2 to zero at step 390. At step 400, the CPU 51 resets the second timer 57 to zero and causes the same to start to operate. Thereafter, the control process returns to step 110, and the procedure starting from step 110 is repeatedly carried out.

Figure 5B:
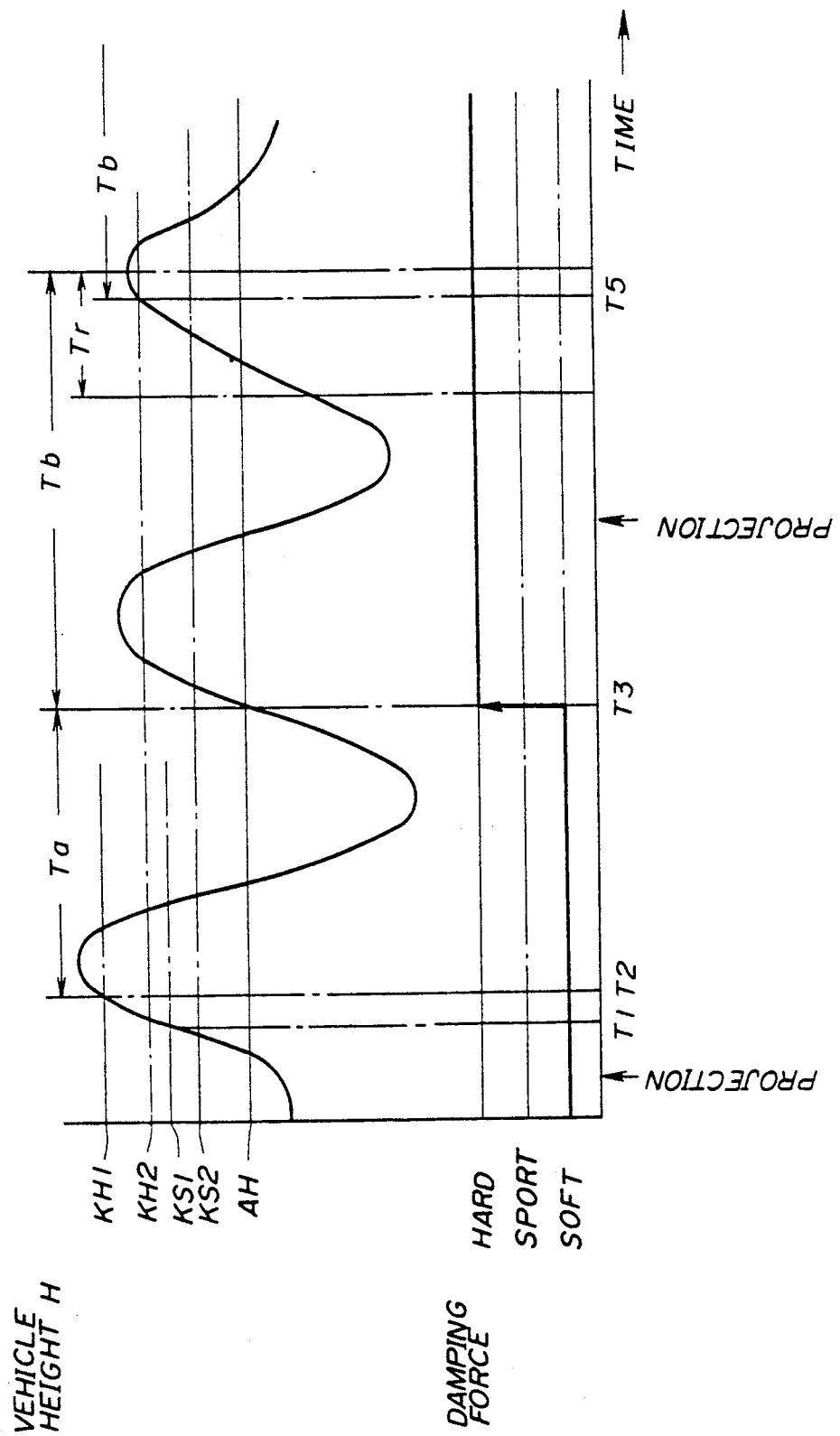

A description will now be given of the operation of the shock absorber controller according to the aforementioned embodiment of the present invention with reference to FIGS. 5A and 5B. When the vehicle runs over a projection on the road surface, as shown in FIG. 5A, the vehicle height H is changed greatly so that it becomes greatly different from the averaged vehicle height AH. When the vehicle height H is changed so that the vehicle height displacement H* is greater than the first sport threshold value KS1, the CPU 51 causes the first timer 56 to start to measure the predetermined delay time Ta from time T1. During the delay time Ta, the CPU 51 determines whether or not the vehicle height displacement H* has become greater than the first hard threshold value KH1 (a sequence of steps 100-190 and 230). When it is determined that the vehicle height displacement H* has become greater than the first hard threshold value KH1 (time T2), the CPU 51 resets the first timer 56 to zero and starts to operate the same (step 210). The damping force of the shock absorber 12a is altered to HARD after the predetermined delay time Ta (T3) from time T2 (a sequence of steps 230-250 and 270). During the hold time Tb from the time at which the damping force is altered to HARD, the damping force is maintained as it is. If the passage time from time T3 at which the damping force is altered to HARD has not yet reached a value obtained by subtracting the predetermined determination executing period Tr from the hold time Tb, that is, if the current time is within a period (inhibiting period) Tc, the procedure for comparing the vehicle height displacement H* with the aforementioned threshold values KH1 and KS1 is inhibited. When the passage time has reached Tr, the procedure for comparing the vehicle height displacement H* with the aforementioned threshold values KH2 and KS2 is executed (a sequence of steps 300 and 310-330). That is, during the determination executing period Tr, a decision is made whether or not the vehicle height displacement H* has become greater than the second sport threshold value KS2 or the second hard threshold value KH2. When the wheel runs over another projection on the road surface and the vehicle height is changed so that the vehicle height displacement H* is greater than the second sport threshold value KS2 (it is assumed that KS2 is less than KH2) after the damping force of the shock absorber 12a is altered to HARD, the CPU 51 alters the damping force to SPORT during the hold time Tb after the elapse of the hold time Tb (T4) (a sequence of steps 370, 390, 400, 300, 310 and 340).

On the other hand, as shown in FIG. 5B, when the vehicle height displacement H* has become greater than the second hard threshold value KH2 within the determination executing period Tr, the hold time Tb during which the damping force is maintained in HARD state is elongated by the hold time Tb from a time (T5) at which the vehicle height displacement H* becomes greater than the second hard threshold value KH2. The damping force of the shock absorber 12a is maintained in HARD state for the elongated hold time Tb (a sequence of steps 300-330, 380-400, 300, 310 and 340).

If there is no projection on the road surface after the damping force of the shock absorber 12a is altered to HARD, as shown by the broken line in FIG. 5A, the vibration of the vehicle body is considerably suppressed. For this reason, there is no possibility that the vehicle height displacement H* will become greater than the second sport threshold value KS2. As a result, the damping force of the shock absorber 12a is restored to SOFT at time T4 after the elapse of the hold time Tb (a sequence of steps 300, 310 and 340-360).

Turning to FIG. 5A, when the vehicle height displacement H* is between the second hard threshold value KH2 and the second sport threshold value KS2, the damping force of the shock absorber 12a is decreased to SPORT at time $T_4$ and is further decreased to SOFT after the elapse of the hold time Tb from time $T_4$.

According to the above-described operation of the shock absorber controller, the determination of the vehicle height displacement H* based on the first sport threshold value KS1 and the first hard threshold value KH1 is inhibited until the passage time $t_2$ reaches the determination executing period Tr after the damping force is altered to HARD. Further, when the passage time $t_2$ is within the determination executing period Tr, the determination of the vehicle height displacement H* based on the second sport threshold value KS2 and the second hard threshold value KH2 is executed. When the vehicle height displacement H* does not exceed the second sport threshold value KS2, the damping force is returned to SOFT after the elapse of the hold time Tb from the time at which the damping force is altered to HARD. With the above-mentioned arrangement, the vibration of the vehicle body is considerably suppressed until the passage time reaches the determination executing period Tr. Thus, there is no possibility that the vehicle height displacement H* will become greater than the second sport threshold value KS2. As a result, it is possible to eliminate the problem where the road surface is determined to be rough even when it is not actually rough and the damping force is maintained in HARD state during a period longer than necessary. Thus, the present invention can provide improved ride comfort.

Further, according to the aforementioned shock absorber controller, when the vehicle height displacement H* becomes greater than the second sport threshold value KS2 (less than the second hard threshold value KH2), the damping force is altered to and maintained in SPORT during the hold time Tb after the elapse of the hold time Tb. When the vehicle height displacement H* becomes greater than the second hard threshold value KH2 within the determination executing period Tr, the damping force is continuously maintained in HARD state during the hold time Tb from the time at which the damping force becomes greater than KH2. With the above-mentioned arrangement, it is possible to alter the magnitude of the damping force, depending on the road surface conditions. In a case where the vehicle is running on a continuous rough road in which there is another projection other than the first projection which causes a change in the vehicle height, the damping force can be altered, depending on the size of the projection or obstacle on the road surface. As a result, it is possible to improve ride comfort.

It should be appreciated that the damping force of each shock absorber is altered at a time corresponding to the end of the first one-cycle of the vibration. This arrangement is extremely effective in improving ride comfort because it is possible to suppress vibration at a time when the vehicle height caused by vibration is first restored to the averaged vehicle height AH and is then restored thereto again after being decreased. It will be noted that the frequency of vibration of the vertical movement of the vehicle body is approximately constant independent of the amplitude thereof. From this point of view, the delay time Ta can be determined beforehand by means of, for example, experiments or calculations, so that the delay time Ta is approximately restored to the aforementioned mean position when it elapses. Similarly, the delay time (hold time) Tb can be determined beforehand.

The value of the period Tb or Tr is a design matter. The present invention is not limited to the four threshold values, and an arbitrary number of them can be used.

The present invention is not limited to the specifically described embodiment, and variations and modifications may be made without departing from the scope of the present invention.

What is claimed is:

1. A shock absorber controller for controlling a damping force of a shock absorber provided between a vehicle body and a wheel, comprising:
   vertical movement detection means for detecting a vertical movement of the vehicle body relative to the wheel;
   first excess determination means, coupled to said vertical movement detection means, for determining whether or not the vertical movement of the vehicle body exceeds a first threshold value;
   damping force increase/hold means, coupled to said shock absorber and said first excess determination means, for altering the damping force of the shock absorber to an increased magnitude when a predetermined delay time elapses from a time at which said first excess determination means determines that the vertical movement of the vehicle body exceeds said first threshold value and for holding the damping force of the shock absorber at said increased damping magnitude for a predetermined hold time;
   timer means, coupled to said damping force increase/hold means, for providing a passage time after predetermined delay time;
   passage time determination means, coupled to said timer means, for determining whether the passage time provided by said timer means represents a time before a determination executing period or within the determination execution period, said determination executing period being a period of time before an end of said predetermined hold time;
   inhibiting means, coupled to said first excess determination means and said passage time determination means, for inhibiting said first excess determination means from determining whether or not the vertical movement of the vehicle body exceeds said first threshold value when said passage time determination means determines that the passage time represents a time before said determination executing period;
   second excess determination means, coupled to said vertical movement detection means and said passage time determination means, for determining, when said passage time determination means determines that the passage time represents a time within said determination executing period, whether or not the vertical movement of the vehicle body detected by said vertical movement detection means exceeds a second threshold value; and
   hold time elongating means, coupled to said damping force increase/hold means and said second excess determination means, for elongating said hold time by a predetermined time when said second excess determination means determines that the vertical movement of the vehicle body exceeds said second threshold value.

2. A shock absorber controller as claimed in claim 1, wherein said second threshold value indicates a position of the vehicle body closer to a mean position of the vehicle body than a position corresponding to said first threshold value.

3. A shock absorber controller as claimed in claim 1, wherein said second threshold value is equal to said first threshold value.

4. A shock absorber controller as claimed in claim 1, wherein said damping force increase/hold means controls the shock absorber so that the damping force thereof is maintained at said increased magnitude for said predetermined time defined by said hold time elongating means.

5. A shock absorber controller as claimed in claim 1, wherein said damping force increase/hold means comprises means for controlling the shock absorber so that the damping force thereof is altered to a decreased magnitude when said second excess determination means determines that the vertical movement of the vehicle body detected by said vertical movement detection means does not exceed said second threshold value during said determination executing period.

6. A shock absorber controller as claimed in claim 1, further comprising third excess determination means, coupled to said vertical movement detection means, for determining, during said determination executing period, whether or not the vertical movement of the vehicle body detected by said vertical movement detection means exceeds a third threshold value which indicates a position of the vehicle body closer to said mean position of the vehicle body than the position corresponding to said second threshold value, wherein said damping force increase/hold means comprises means for altering the damping force of the shock absorber to a decreased magnitude which is greater than a magnitude suitable for said mean position and is less than said increased magnitude when the vertical movement of the shock absorber is between said second threshold value and said third threshold value.

7. A shock absorber controller as claimed in claim 6, wherein said damping force increase/hold means comprises means for altering the damping force of the shock absorber to a second decreased magnitude which is suitable for said mean position of the vehicle body when the vertical movement of the shock absorber is less than said third threshold value.

8. A shock absorber controller as claimed in claim 6, wherein said damping force increase/hold means comprises means for altering the damping force of the shock absorber to a second decreased magnitude suitable for said mean position of the vehicle body when a time approximately equal to said hold time elapses from the end of said hold time so that the damping force of the shock absorber is decreased to said second decreased magnitude from said decreased magnitude.

9. A shock absorber controller as claimed in claim 1, further comprising:
third excess determination means, coupled to said vertical movement detection means, for determining whether or not the vertical movement of the vehicle body exceeds a third threshold value which indicates a position closer to said mean position thereof than the position corresponding to said first threshold value; and
starting point change means, coupled to said first and third excess determination means and said damping force increase/hold means, for changing a start point of said predetermined delay time from said time at which said third excess determination means determines that the vertical movement of the vehicle body exceeds said third threshold value to said time at which said first excess determination means determines that the vertical movement of the vehicle body exceeds said first threshold value.

10. A shock absorber controller as claimed in claim 1, wherein said determination executing period is less than said predetermined hold time.

11. A shock absorber controller as claimed in claim 1, wherein said predetermined delay time is so determined that the vertical movement of the vehicle body is returned approximately to the mean position of the vehicle body when said predetermined delay time elapses.

12. A shock absorber controller as claimed in claim 1, wherein said vertical movement detection means comprises:
vehicle height detection means for periodically detecting a vehicle height of said vehicle body;
averaging means for averaging past vehicle heights supplied from said vehicle height detection means and for outputting an averaged vehicle height; and
vehicle height displacement calculating means, coupled to said vehicle height detection means and said averaging means, for calculating an absolute value of a difference between said averaged vehicle height and a current vehicle height, said absolute value of the difference indicating said vertical movement of the vehicle body.

13. A shock absorber controller for controlling a damping force of a shock absorber provided between a vehicle body and a wheel, comprising:
vertical movement detection means for detecting a vertical movement of the vehicle body relative to the wheel;
first excess determination means, coupled to said vertical movement detection means, for determining whether or not the vertical movement of the vehicle body exceeds a first threshold value;
damping force increase/hold means, coupled to said shock absorber and said first excess determination means, for altering the damping force of the shock absorber to an increased magnitude when a predetermined delay time elapses from a time at which said first excess determination means determines that the vertical movement of the vehicle body exceeds said first threshold value and for holding the damping force of the shock absorber at said increased damping magnitude for a predetermined hold time;
second excess determination means, coupled to said vertical movement detecting means, for determining, during a determination executing period after a predetermined inhibiting time elapses, whether or not the vertical movement of the vehicle body exceeds a second threshold value which indicates a position of the vehicle body closer to a mean position of the vehicle body than a position corresponding to said first threshold value; and
hold time elongating means, coupled to said damping force increase/hold means and said second excess determination means, for elongating said hold time by a predetermined time from an end point of said determination executing period when said second excess determination means determines that the vertical movement of the vehicle body exceeds said second threshold value.

14. A shock absorber controller as claimed in claim 13, wherein said damping force increase/hold means controls the shock absorber so that the damping force of the shock absorber is maintained at said increased magnitude for said predetermined time defined by said hold time elongating means.

15. A shock absorber controller as claimed in claim 13, wherein said damping force increase/hold means comprises means for controlling the shock absorber so that the damping force thereof is altered to a decreased magnitude when said second excess determination means determines that the vertical movement of the vehicle body detected by said vertical movement detection means does not exceed said second threshold value during said determination executing period.

16. A shock absorber controller as claimed in claim 13, further comprising third excess determination means, coupled to said vertical movement detection means, for determining, during said determination executing period, whether or not the vertical movement of the vehicle body detected by said vertical movement detection means exceeds a third threshold value which indicates a position of the vehicle body closer to said mean position than the position corresponding to said second threshold value, wherein said damping force increase/hold means comprises means for altering the damping force of the shock absorber to a decreased magnitude which is greater than a magnitude suitable for said mean position and is less than said increased magnitude when the vertical movement of the shock absorber is between said second threshold value and said third threshold value.

17. A shock absorber controller as claimed in claim 16, wherein said damping force increase/hold means comprises means for altering the damping force of the shock absorber to a second decreased magnitude which is suitable for said mean position of the vehicle body when the vertical movement of the shock absorber is less than said third threshold value.

18. A shock absorber controller as claimed in claim 16, wherein said damping force increase/hold means comprises means for altering the damping force of the shock absorber to a second decreased magnitude suitable for said mean position of the vehicle body when a time approximately equal to said hold time elapses from the end of said hold time so that the damping force of the shock absorber is decreased to said second decreased magnitude from said decreased magnitude.

19. A shock absorber controller as claimed in claim 13, further comprising:
  third excess determination means, coupled to said vertical movement detection means, for determining whether or not the vertical movement of the vehicle body exceeds a third threshold value which indicates a position closer to said mean position thereof than the position corresponding to said first threshold value; and
  starting point change means, coupled to said first and third excess determination means and said damping force increase/hold means, for changing a start point of said predetermined delay time from said time at which said third excess determination means determines that the vertical movement of the vehicle body exceeds said third threshold value to said time at which said first excess determination means determines that the vertical movement of the vehicle body exceeds said first threshold value.

20. A shock absorber controller as claimed in claim 13, wherein said determination executing period is less than said predetermined hold time.

21. A shock absorber controller as claimed in claim 13, wherein said predetermined delay time is so determined that the vertical movement of the vehicle body is returned approximately to the mean position of the vehicle body when said predetermined delay time elapses.

* * * * *